May 7, 1968

A. LOCHER 3,381,725

AUTOMATIC DRILL AND INSERTING MACHINE

Filed April 21, 1966

Inventor
Alfred Locher

By

Watson, Cole, Grindle + Watson
Attorneys

May 7, 1968

A. LOCHER 3,381,725

AUTOMATIC DRILL AND INSERTING MACHINE

Filed April 21, 1966

Inventor
Alfred Locher,
By
Watson, Cole, Grindle & Watson
Attorneys

May 7, 1968  A. LOCHER  3,381,725
AUTOMATIC DRILL AND INSERTING MACHINE
Filed April 21, 1966  5 Sheets-Sheet 4

Inventor
Alfred Locher
By
Watson, Cole, Grindle & Watson
Attorneys

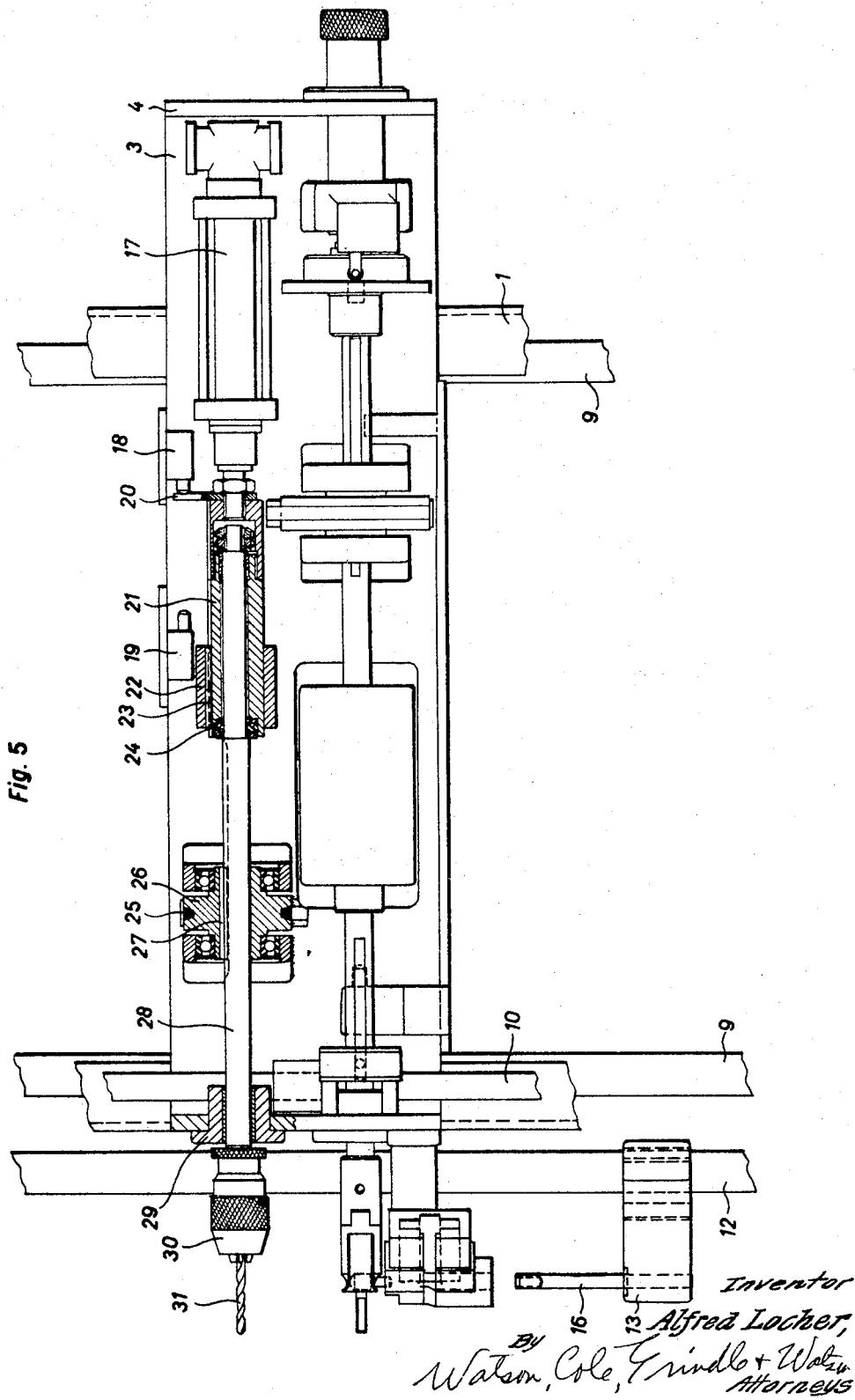

3,381,725
AUTOMATIC DRILL AND INSERTING
MACHINE
Alfred Locher, Durststrasse 62, Meilen,
Zurich, Switzerland
Filed Apr. 21, 1966, Ser. No. 545,533
Claims priority, application Switzerland, Oct. 22, 1965,
14,783/65
22 Claims. (Cl. 144—3)

ABSTRACT OF THE DISCLOSURE

An inserting device for the insertion of fittings into previously drilled holes into windows, doors and the like and their frames. The device comprises an inserting head for insertion of the fittings into the holes, a shaft for the inserting head movable in an axial direction, means for imparting rotary movement and feed movement to the shaft during the insertion of a fitting in the direction of the workpiece, a stop element attached to the shaft to limit the feed and to fix simultaneously the angular position of the shaft in a predetermined angular end position, and a fixed impact element for the stop element, said stop element participating in the rotary and feed movement of the shaft and runs against the fixed impact element tangentially upon reaching a predetermined feed limit corresponding to the depth of the insertion.

---

Figure 1:
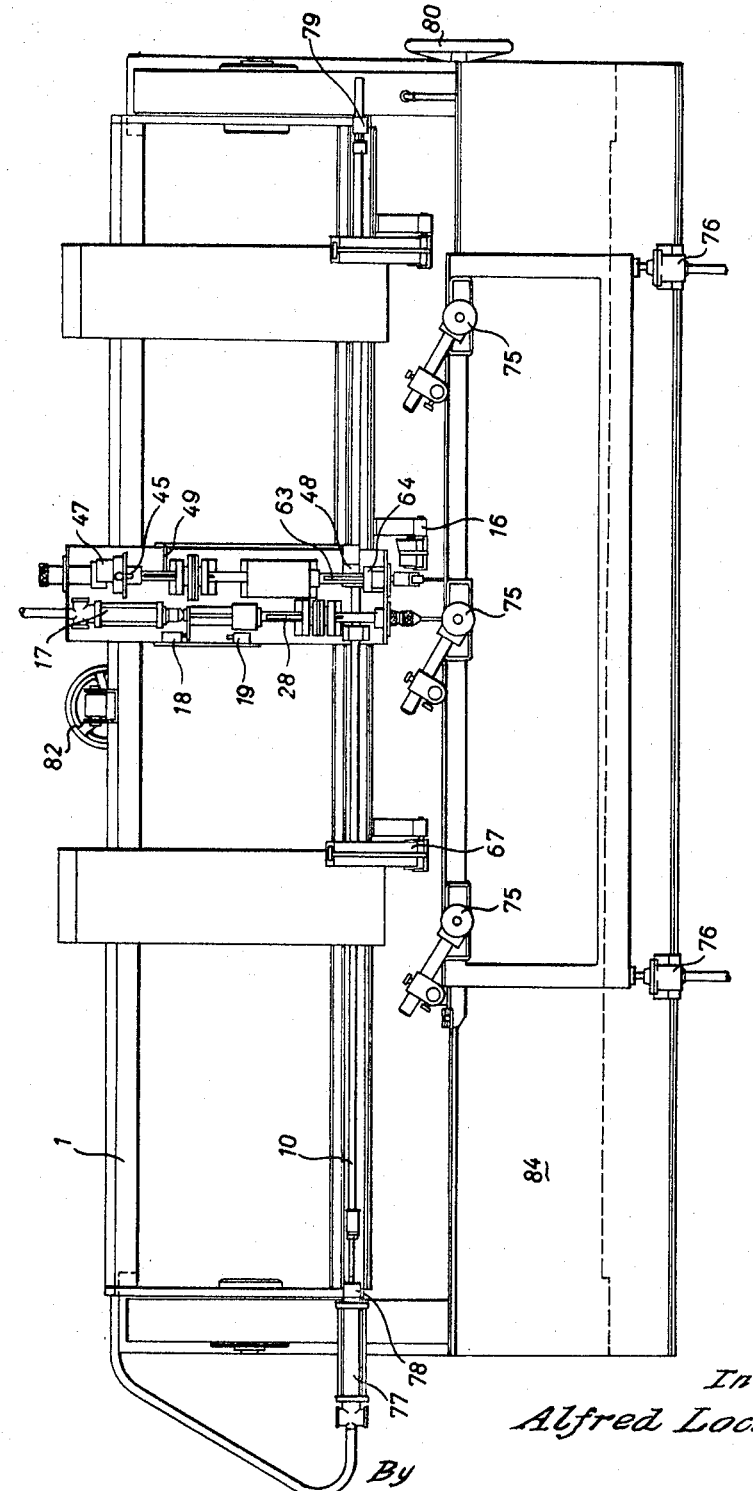

This invention relates to an inserting device for insertion of fittings into previously drilled holes, especially for insertion of hinge and connecting elements into windows, doors, and their frames with an inserting head for inserting the respective fittings into the holes.

It is therefore an object of this invention to provide an automatic drill and inserting machine for inserting fittings into holes that have been drilled previously in each instance in wooden workpieces, especially for inserting hinge and connecting parts in windows, doors and frames, with a least one aggregate comprising a drilling device and inserting device of a special type and with means for controlling the machine. Such control is for the purpose of bringing the boring head and the inserting head, one after the other, in front of a certain spot or section in the workpiece, in order to accomplish automatically the predrilling of a hole at this spot, as well as the insertion of the specific fitting into the hole.

In prior automatic machines, an exact alignment of the hinge bolts or of the associated counterpieces of the hinge is not possible during the automatically accomplished twisting-in of said pieces into the workpiece. The reason for this is to be found in the fact, that the problem of stopping the twisting-in method could, up until now, not be satisfactorily solved in the case of a very special angular position. This problem is connected with particular difficulties insofar as, on the one hand, the rotational energy of the rotating parts of the driving device, connected with the hinge part that is to be twisted in, will still continue to twist the hinge part some distance, even after the switching off or uncoupling of the driving motor, and, on the other hand, however, as this distance will vary depending on the hardness of the wood at the spot where the twisting-in takes place or according to the resistance with which the wood opposes the twisting-in, such wood material will press solidly against tthe threaded bolt of the hinge element. This variation of the deceleration distance may be very great even in the same workpiece, if, for example, the one twist-in hole is located immediately beside a branch in the wood or beside a knot portion therein and the other twist-in hole is located in the soft wood. Because of this variability of the deceleration distance, it is not possible either to allow for the deceleration distance through switching off of the driving motor at a certain angle prior to its having reached the desired angular position, because at such a premature turning off, the desired angular position will either not be achieved at the twisting-in place in the case of hard wood, or it will proceed to be exceeded at the place of twisting-in in the case of soft wood.

Also efforts have been made to find a way out by destroying, through a brake, the rotational energy still prevalent at the switching off or uncoupling of the driving motor, in order to keep the deceleration distance as small as possible and as constant as possible in this manner.

But this solution too would not yet bring about the desired results, because even a very insignificant deviation from the required angular position of the hinge bolts would make a subsequent alignment of said bolts necessary. These insignificant deviations, however, were unavoidable for a number of reasons, for example, wearing down of the contacts of the electrical cut out, variation of the braking action, wearing down of the brakes, and other reasons.

Therefore, the problem on which the invention was based was to create an inserting device which would make possible an exact alignment of the hinge bolts or of the associated hinge counterparts immediately during the automatic twisting-in of said parts into the workpiece.

According to the present invention there will be achieved desired results in that the inserting head is attached to a shaft which is movable in axial direction, and in that means have been provided to impart to the shaft a rotational movement and a feed movement in the direction of the workpiece during insertion of the fitting element, and further in that, for the limitation of the feed and for the simultaneous fixation of the angle of the shaft or of the inserting head, a stop piece has been attached to the shaft in the end position, which stop participates in the rotational and feed movement of the shaft and which collides tangentially with a locally fixed stop, whenever a feed limit has been reached, which is predetermined in correspondence to the inserting depth.

It will be particularly advantageous to provide a threaded spindle for the feed of the shaft, which is in frictional connection with the shaft and, upon turning of the shaft, it will cause a feed of the shaft corresponding to the pitch of its thread. For the purpose of adapting the pitch of the threaded spindle to the pitch of the fitting elements that are to be inserted, said threaded spindle, including its threaded bushing, might, for practical purposes, be exchangeable with threaded bolts. For this purpose, the threaded spindle with the threaded bushing may advantageously be arranged on one end of the shaft in such a manner, that the axis of the spindle will coincide with the axis of the shaft, whereby, for the purpose of coupling the threaded spindle with the shaft, one part piece of a positive coupling may be attached to the end of the shaft and a counterpiece on the end of the threaded spindle.

Advantageously, a pneumatic or hydraulic pressure cylinder may also be provided, however, instead of the threaded spindle for the feed of the shaft. In that case, an adaptation to the pitch of fitting elements that are to be inserted with threaded bolts will not be required in the case of a pneumatic pressure cylinder and will only be required in the case of a hydraulic pressure cylinder, insofar as the temporary rate of flow of the pressure fluid should be synchronous with the pitch of the fitting parts that are to be inserted.

For practical purposes, furthermore, a motor can be provided for the drive of the shaft and a switch device for switching off the drive of the shaft when a feed limit has been reached. It would further be advantageous to arrange between the motor and the shaft, a coupling, operable by means of the switch device.

For the adjustment of the depth of the insertion of the fitting parts that are to be inserted, it would be advantageous if the above mentioned locally fixed stop were adjustable. In that case, it would be practical if the switch device would likewise be adjustable and would be rigidly connected with said stop, so that it would be adjusted in an equal measure whenever the stop was adjusted or shifted.

In the case of the present inserting device, one could attach, for the purpose of twisting-in of elements for the fitting as an inserting head, a twisting-in head to the shaft in such a manner, that it would be positively connected with the shaft at least during the twisting-in of the fitting element. In order to release the positive connection between the shaft and the twisting-in head prior to and after the twisting-in, it would be advantageous to attach, between the twisting-in head and the shaft, a coupling which would engage the twisting-in head only at a counterpressure. For practical purposes, said coupling may be developed in such a manner, that a pressure spring would be arranged between the two coupling elements of this coupling, and that on the one coupling element, a driver pin, mounted resiliently on one of the coupling elements in its axial direction and a recess for engaging the driver pin be provided on the other coupling element, and that, furthermore, the driver pin and/or the recess may be bevelled on that side located in the untwisting direction in such a manner, that the driver pin, during return travel of the shaft, after the fitting element has been twisted in, will be squeezed out from the recess and will transmit no return travel momentum to the fitting element that has been twisted in. It will furthermore be advantageous if said twisting-in head be attached to the coupling by means of an intermediate shaft, whose angular position will be fixable during the return travel by means of a fixing pin meshing with a groove in the intermediate shaft and electromagnetically operable.

It would furthermore be advantageous, if the twisting-in head would be equipped with a holder for the fitting element that is to be twisted in, in which said fitting element can be inserted in an angular position, fixed in relation to the holder, whereby said holder has been attached to the twisting-in head at such an angular position, that the fitting element upon engagement of the coupling will have the predetermined angular position between the twisting-in head and the shaft, and, whenever the stop element rests against the stop, it will have the angular position predetermined by means of the provided arrangement of the fitting element in the workpiece. For the insertion of different fitting elements, the holder could advantageously be exchangeable. It would furthermore be advantageous if an automatic reloading device were provided for the insertion of the fitting elements into the holder.

It would be advantageous to develop the present inserting device in such a manner, that the inserting head be exchangeable and that instead of the twisting-in head, a squeezing-in or pressing-in head be inserted, so that the inserting device would also be suitable for squeezing or pressing-in of fitting elements. For practical purposes, the squeezing-in head could be developed in such a manner, that it be equipped with a thrust rod which is arranged in a guide bushing longitudinally shiftable, that the fitting elements be insertable into the guide bushing in front of the front end of the thrust rod and that at the rear end of the thrust rod, a rotatable coupling element be attached with a bearing. Here again it would be advantageous to provide an automatic reloading device for the insertion of the fitting elements that are to be squeezed into the squeezing-in head.

On the basis of the development of the shaft, which in the present inserting device is movable in an axial direction, and an inserting head, which is longitudinally shiftable to the same extent and which is attached to it, it would be possible to arrange the aggregates, comprising the drilling device and the inserting device, in the case of an automatic drill and inserting machine equipped with an inserting device according to the invention, shiftably in parallel to the workpiece holder. It would be advantageous to attach the aggregates for this purpose shiftably to a longitudinally shiftable thrust rod, arranged in parallel to the workpiece holder, whereby for the longitudinal shifting of the thrust rod, a lifting cylinder may be provided. The aggregates, including the device for the shifting of said aggregates, may furthermore be attached to a swinging aggregate bearer, whereby then a horizontally and perpendicularly adjustable work table can be provided as a workpiece holder.

Figure 2:
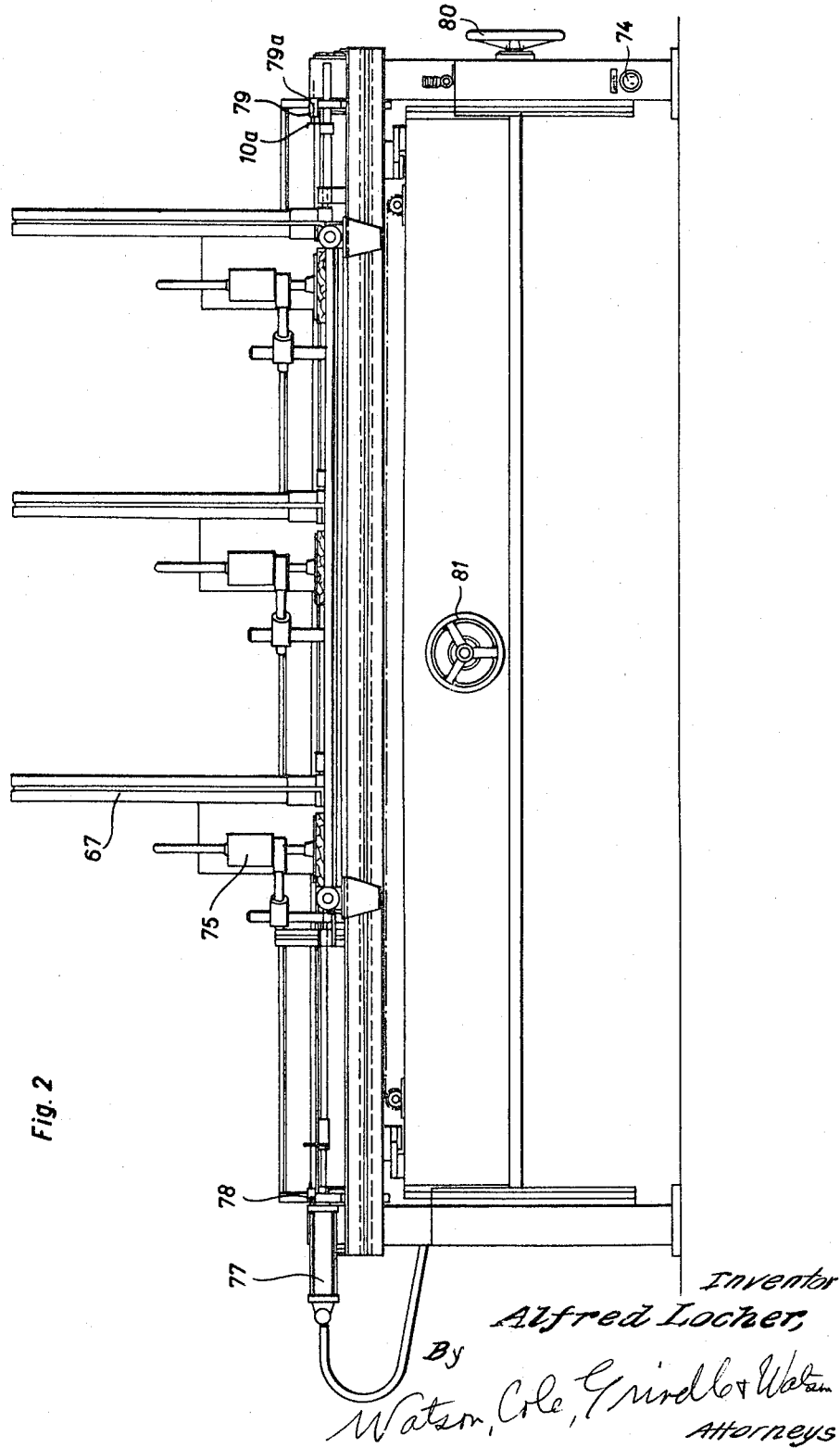
Figure 3:
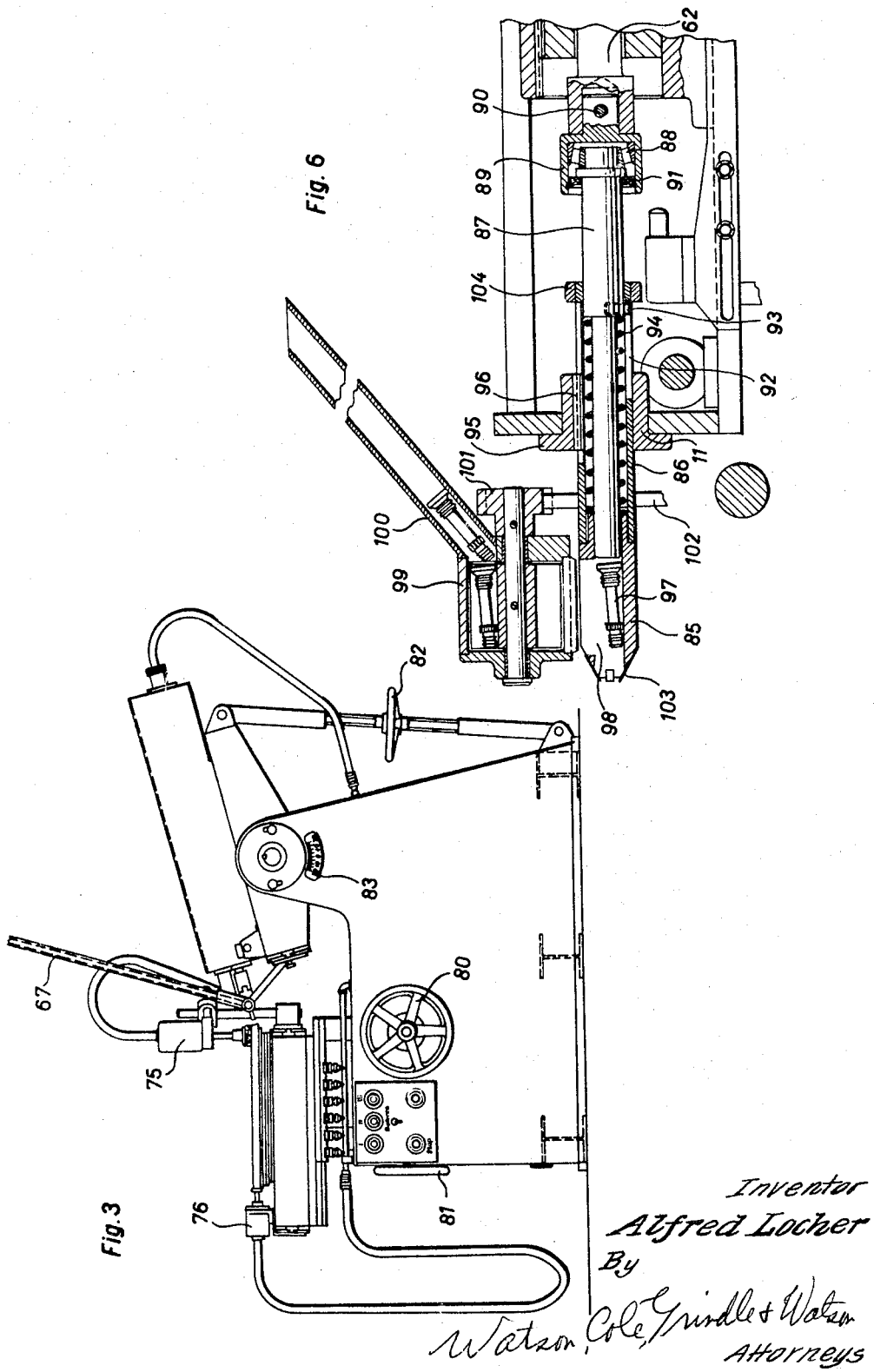
Figure 4:
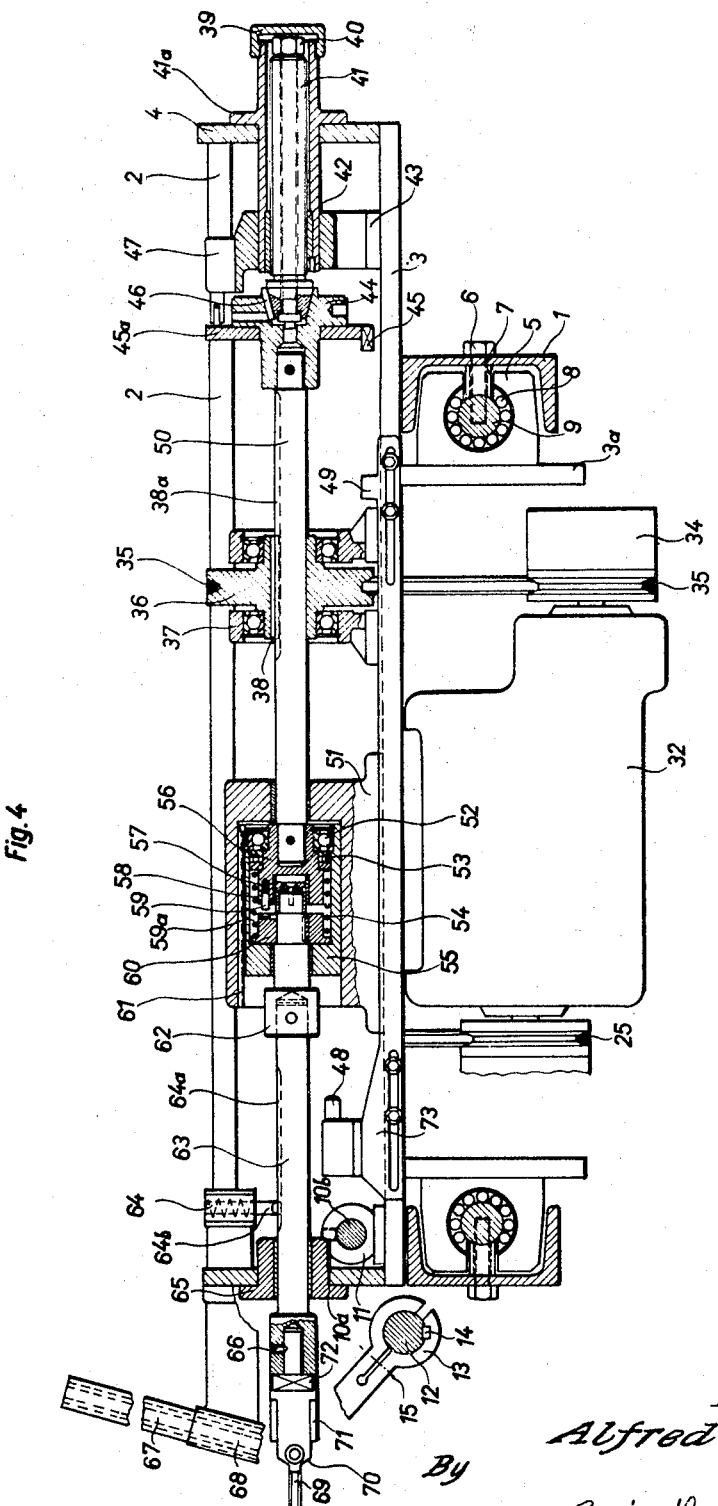

Further objects of the invention will be apparent from the following description when considered in connection with the accompanying drawings in which;

FIGURE 1 is a top plan view of the automatic drill and inserting machine provided with an inserting device according to the invention, FIG. 2 is a front elevational view of the automatic machine according to FIG. 1, FIG. 3 is an end elevation of the automatic machine of FIG. 1, FIG. 4 is a sectional view showing the drill aggregate and a twisting-in aggregate of the automatic machine, FIG. 5 is a plan view partly in section showing the drilling and twisting-in aggregate of the automatic machine, and FIG. 6 is a section of the detail of the squeezing-in head insertable instead of the twisting-in head into the drilling and twisting-in aggregate.

According to the design shown, the installation has an aggregate bearer or frame 1 which, mounted is swivelably seated on a machine frame. On this bearer 1, there are three drilling and twisting-in aggregates which are longitudinally guided and shiftably and fixably in the bearer 1.

Each aggregate has a base plate 3. One bearing bushing 8 has been attached across the width of the base plate to one elbow 3a, pointing downwards, of the base plate 3. A guide bar 9 is attached to the bearer 1 above an expansion bolt connection, said bar serving for guiding the aggregates along the bearer 1.

On the longitudinal side of the bearer 1, there is a thrust rod 10 which is longitudinally shiftable and at one end is connected to a lift cylinder 77.

On the thrust rod 10, the individual aggregates are fixed in certain positions on the bearer 1 and this is accomplished by means of screws 10a, which can be unscrewed or screwed in projections 10b on the base plate 3. The thrust rod is guided longitudinally in bearings 78 and 79 on the bearer 1.

A spindle 28 and a drilling motor 32, for drilling holes in window frames, has been arranged on the base plate 3 of each aggregate. Beside that, a shaft 50 with a twisting-in head 72, 63, has been arranged, likewise driven by the motor 32, and for the purpose of twisting in the fittings 64, in the present case of drilling-in-fittings, into previously drilled holes. The motor 32 is attached to the base plate 3 and drives the pulley 26 by means of the V-belt 25. The spindle 28 has a drill head 30 on the outside of the housing front plate 4a for reception of the drill bit 31, and it is guided in bearing 29. In the inside of the housing at the other end of the spindle 28, a lift cylinder 17 has been arranged. The spindle 28 is additionally guided through the bearing support 22a and the guide bearing 22. The pulley 26 has been provided with a wedge or key 27, which is located in a wedge path or groove 27a, and is longitudinally shiftable relative to the spindle 28. At the piston end of the cylinder 17 there is attached a switch stop 20 for operation of switches 18 and 19.

The shaft 50 is driven by the motor 32 by means of a V-belt 35 and pulley 36, which is mounted in the bracket 37 and which is connected by means of wedge 38 in the wedge path or groove 38a, longitudinally shiftable with the shaft 50. The intermediate shaft 63 bears the twisting-in or inserting head 72 and has been connected at its other end by means of coupling shaft 62 with the coupling element 60.

At the rear end of the shaft 50 is the switch off disc 45a attached to the cone friction clutch 44, in which the threaded spindle 41 with threaded bushing 42 has been screwed on through screw or nut 40. The threaded spindle 41 and the threaded bushing 42 are connected through the bearing 41a with the housing plate 4 and they are closed with the cover hood or cap 39. The threaded spindle 41 has a conical end which has been inserted by means of wedge 46 into the cone-shaped recess of the coupling 44.

The switching off disc 45a has a stop element 45, which abuts or contacts at the end of the twisting-in process, tangentially with the adjustable stop 49 and, thus, determines the angular position of the fitting element 69 in its end position.

Prior to collision or contact of the stop element 45 onto the stop 49, the coupling bushing 55 will encounter the switch 48, which on its part will switch off the coupling 44. Upon return of the shaft 50, the switch off disc 45a will operate the switch 47.

The intermediate shaft 63 has been connected releasably with a shaft 50 by means of a coupling 56, 60. This coupling 56, 60 is held together by the coupling bushing 55 and has been longitudinally guided in the housing 51. If during the twisting-in process the fitting 69 reaches the bore hole, then the coupling 56, 60 will engage through the developing counterpressure. At the same time, the driver pin 59, which is located in the coupling element 56 and which is cushioned with a spring 57, engages in the recess 59a in the coupling element 60.

As a result thereof, the twisting-in head 72 is placed in revolving motion. During the return of the shaft 50 the counterpressure is dissolved and the spring 54 forces the two coupling elements 56 and 60 apart, so that the twisting-in element 72 does not participate in the revolving movement. In order to secure the angular position of the twisting-in head 72, the pin 64b, operated by the electromagnet 64, will engage in the longitudinal groove 64a in the intermediate shaft 63 at the moment, that the twisting depth has been reached. When regaining the starting position, the pin 64b is again pulled out from the groove 64a.

The adjustable end switch 48 and the end stop 49 are firmly connected with one another by means of a rod or frame 73 and they can easily be adjusted outside the housing for the various twisting-in depths. The twisting-in head 72 has been releasably connected with the intermediate shaft 63 through opening, that is, unscrewing the screw 66. The fitting elements 69 are held by springs 70, fixed by means of plates 71. The fitting 69 is pushed with the thrust pin 16 in the holder 13, which is located on the bar 12, from the filled magazine 67 into the twisting-in head 72. The magazine 67 is placed easily exchangeably in the magazine holder 68, which on its part is attached easily exchangeably to the the front plate 4a.

The clamping-down devices 75 and 76, FIG. 1, are located on the supporting table 84, and they have been attached adjustably in longitudinal grooves at the edge of the table. The table 84 is adjustable in height by means of a handwheel 80 and in depth by means of a handwheel 81. The aggregate bearer 1 can be adjusted in its pitch or slope by means of an adjusting screw with a handwheel 82, FIG. 3.

The feeding of the fittings or hinges 69 from the magazine 67 is accomplished automatically. According to the structure shown, each time the pin 16 emerges from the magazine holder 68 during the shifting of the aggregate, a fitting or hinge 69 will drop into the storage of the magazine holder 68, from which the pin 16 will push the fitting 69 into the twisting-in head 72 at a pushing back of the aggregates.

In the following the method of operation is explained as to the installation on the basis of an example of twisting in of fitting 69 into a window frame. There is assumed the existence of an electric control installation for the operation of the electric installation.

The fitting 69 is a head piece with inserted threaded bolts. Such a fitting now is supposed to be twisted or screwed into the wood, whereby, first of all, the bore hole is made automatically and then the twisting in of the fitting takes place. The control impulses are triggered, one after the other, for the automatic execution of the different work processes and this is accomplished as follows:

If the wood member has been placed onto the table 84, then, by the operation of a switch, a pneumatic valve for the clamping cylinders 75 and 76 is opened and simultaneously the drill motor 32 will be switched on by a further impulse over a delaying relay and the drilling stroke is released. In this position, the switch stop 20 rests against the switch 18, which is fixedly connected with a piston of a drill cylinder 17. The drilling in the wood is then accomplished. During this time the drill bit 31 thrusts ahead until the switch stop 20 hits the switch 19 and the valves are reversed for the return movement, whereby the motor is simultaneously switched off. At the same time, the end switch 18 induces the opening of the valve for the cylinder 77, in order to induce the piston in the cylinder 77 in the sense of shifting the aggregates on the bearer 1, and, to be sure, by the amount of the distance from the drill axis to the twisting-in axis, as a result of which the twisting-in installation is moved in front of the bore hole in the wood. At the same time, a stop 10a on the thrust rod 10 was guided against the end switch 79a, which turns on the motor 32 and operates the clutch 34 for the twisting-in movement of the shaft 50.

The fitting 69 is now pushed with the twisting-in head 72 up to the surface of the wood. As soon as the fitting 69 hits the wood, a counterpressure against the coupling 56, 60, will develop, so that the latter will couple or engage and the fitting 69 will be twisted into the predrilled hole.

When the coupling bush 55 runs up against the switch 48, the coupling 34 will be disengaged, and immediately after that the stop element 45 hits the stop 49 so that the rotational direction of the motor 32 is reversed or changed. Thus the coupling 34 is again engaged and, simultaneously, the electromagnet 64 is activated, and the clamping cylinder 75 and 76 are released by means of a valve as well. The twisting-in head 72 and the shaft 50 now move back, whereby only the shaft 50 rotates. Upon reaching the starting position, the switch 47 is operated by means of the switch disc 45a, said switch switching the valve for the cylinder 77 to reverse and disengage the coupling 34 as well as the motor 32 and operates the magnet 64 to lift out the pin 64b. Thus the aggregates on the bearer 1 move back into their starting or drilling position and, to be sure, they accomplish this through the fact that the piston of the cylinder 77 will move back the thrust rod 10 and carries along the aggregates. At the same time, the fitting pin 16, fixed on the rod 12 and the holder 13, will push a new fitting from the magazine housing 68 into the twisting-in head 72.

For pressing in or fitting elements, for example, of connecting screws, into the window casings of double windows, one could insert the pressing-in head shown in FIG. 6 instead of the twisting-in head 72 with the intermediate shaft 63. The pressing-in head 85 consists of the guide bushing 86 which is longitudinally shiftable in the flange bearing 95, in which bushing a pressing-in piston 87 has been shiftably arranged. The piston 87 protrudes at the rear end from the guide bushing 86 and has been equipped at that end with a tapered-roller bearing 88, which has been inserted into a bearing head 89 with a coupling element 90 attached. During the assembly of the pressing-in head, the coupling element is inserted into the coupling shaft 62. So that the tapered-roller bearing 88 cannot slip out from the bearing head 89 during the return of the shaft 50 of the coupling shaft 62 connected with the former, a return disc 91 has also been attached in the bearing head 89 in front of the tapered-roller bearing 88. The tapered-roller bearing 88 serves for the purpose of not transmitting the torsion of the shaft 50 or of the coupling shaft 62 to the pressing-in piston 87 during the pressing-in process. The guide pin 93, which is longitudinally shiftable in a slot 92 in the guide bushing 86, prevents a rotation of the pressing-in piston 87. A rotation of the guide bushing itself has been prevented through the guide wedge or key 96 running in a groove in the guide bushing. The guide bushing 86 ends in front in a piston housing 98, into which the fitting elements, in the present case connecting screws 97, can be introduced. For the introduction of the connecting screws into the piston housing, the recharging device, consisting of the turret head 99 and the feed hose 100, as well as the driving elements 101, 102 for turning of the turret head, has been provided.

The pressing-in head 85 is first brought up to the workpiece for pressing-in of a fitting element into the workpiece, just like the twisting-in head 72, until the centering springs 103 meet the predrilled hole. At the same time, the guide bushing 86 is shifted in the flange bearing 95, while the piston 87 retains its position in the guide bushing 86 on the basis of the action of the spring 94. As soon as the centering springs rest on the edge of the hole, with a further forward movement of the shaft 50 or of the coupling shaft 62, the pressing-in piston 87 is thrust into the piston housing 98 and, as a result thereof, the connecting screw 97 is pressed into the predrilled hole. At the return movement of the shaft 50, first of all, the piston 87 will move back, until the guide pin 93 connects with the position (stop) 104 and, subsequently, the guide bushing 86 is drawn back.

I claim:

1. Inserting device for the insertion of fittings into predrilled holes, especially for the insertion of hinge fittings and connecting elements into windows, doors and their frames, comprising an inserting head for insertion of the fittings into the holes, a shaft for the inserting head movable in an axial direction, means for imparting rotary movement and feed movement to the shaft during the insertion of a fitting in the direction of the workpiece, a stop element attached to the shaft to limit feed and to fix simultaneously the angular position of the shaft, and a fixed stop to abut the stop element, said stop element participating in the rotary and feed movement of the shaft and runs against the fixed stop tangentially upon reaching a predetermined feed limit corresponding to the depth of the insertion.

2. Inserting device according to claim 1, in which a threaded spindle is provided connected to feed the shaft and which is connected with the shaft and which on rotation of the shaft causes a movement of the shaft corresponding to the pitch of a thread.

3. Inserting device according to claim 2, in which the threaded spindle and its threaded bushing is replaceable.

4. Inserting device according to claim 3, in which a positive coupling is provided and the threaded spindle with the threaded bushing is arranged at one end of the shaft so that the spindle axis is coincident with the axis of the shaft, the positive coupling being attached at the end of the shaft as to one part element of the positive coupling and another part of the coupling being attached on the threaded spindle.

5. Inserting device according to claim 1, in which a fluid pressure cylinder is provided connected to operate the feed movement of the shaft.

6. Inserting device according to claim 1, in which a motor is provided for the drive of the shaft, and in which a switching device switches off the drive of the shaft upon reaching the limit of the feed movement.

7. Inserting device according to claim 6, in which a coupling is provided between the motor and the shaft operable by the switching device and arranged between the motor and the shaft.

8. Inserting device according to claim 1, in which the fixed stop is adjustable as to a setting for a certain insertion depth of the fitting.

9. Inserting device according to claim 6, in which a fixed connection is provided between the switching device and the fixed impact element and the position of the impact element and simultaneously with that the position of the switching device, are adjustable.

10. Inserting device according to claim 1, in which the inserting head is a twisting-in head attached to the shaft, so that it will be connected with the shaft at least during the twisting-in of the fitting.

11. Inserting device according to claim 10, in which a coupling is provided engaging only when counterpressure is exerted upon the twisting-in head and which is arranged between the twisting-in head and the shaft.

12. Inserting device according to claim 11, in which a pressure spring is provided arranged in the coupling attached between the shaft and the twisting-in head, the coupling comprising two elements of which one coupling element having a driver pin which is mounted resiliently in its axial direction, and the other coupling element having a recess for engagement of the driver pin, said driver pin and the recess being bevelled on that side facing the reversing rotary direction so that the driver pin during the reversing movement of the shaft and after inserting of a fitting being forced out of the recess so as not to transmit the reversing torque to the inserted fitting.

13. Inserting device according to claim 12, in which an intermediate shaft is provided connecting the twisting-in head with the coupling and having a groove, and in which an electromagnetically operable fixing pin is provided which engages with the groove in the intermediate shaft during the reversing movement of the intermediate shaft thereby holding the intermediate shaft in a predetermined angular position.

14. Inserting device according to claim 10, in which a holder is provided for the twisting-in head for the fitting that is to be inserted and twisted-in, said fitting adapted to be inserted into the holder at an angular position which is fixed in relation to the holder, and the holder being attached to the head in such an angular position that the fitting will have the angular position that has been predetermined by the arrangement of the fitting in the workpiece, between the twisting-in head and the shaft and where the stop element rests against the stop.

15. Inserting device according to claim 14, in which an automatic reloading device is provided to introduce the fittings in the holder.

16. Inserting device according to claim 10, in which means are provided to press in the fittings.

17. Inserting device according to claim 16, in which a pressing-in piston is provided for the last mentioned means and arranged longitudinally slideable in a guide bushing, and in which the fittings may be placed into the guide bushing in front of the front end of the pressing-in piston, and a rotatable coupling element is provided attached to the rear end of the pressing-in piston with a bearing.

18. Inserting device according to claim 17, in which an automatic loading device is provided for guiding the fittings that are to be pressed into the head.

19. Automatic drilling and inserting device for inserting fittings into holes in wooden workpieces, which in each instance have to be predrilled, especially for the insertion of hinge-parts and connecting elements in windows, doors and their frames with aggregates, comprising at least one drilling device and one inserting device, and control means to bring a drilling head and an inserting head, one after the other, in front of a certain place in the workpiece and in order to effect automatically the predrilling of a hole in said place as well as the insertion of the fitting into said hole, the inserting device comprising an inserting head for insertion of the fittings into the holes, a shaft for the inserting head movable in an axial direction, means for imparting rotary movement and feed movement to the shaft during the insertion of a fitting in the direction of the workpiece, a stop element attached to the shaft to limit the feed and to simultaneously fix the angular position of the shaft in a predetermined angular end position, and a fixed impact element for the stop element, said stop element participating in the rotary and feed movement of the shaft and runs against the fixed impact element tangentially upon reaching a predetermined feed limit corresponding to the depth of the insertion.

20. Automatic drilling and inserting device according to claim 19, in which the aggregates are arranged shiftably parallel to a support of the workpiece.

21. Automatic drilling and inserting device according to claim 19, in which the aggregates are attached adjustably to a thrust rod which is longitudinally slideable and which has been arranged in parallel to a support of the workpiece, and in which a thrusting cylinder is provided for the longitudinal sliding of the thrust rod.

22. Automatic drilling and inserting device according to claim 19, in which the aggregates are mounted on a swivelable support and in which a work table is provided which is horizontally and perpendicularly adjustable provided as a support for the workpiece.

References Cited

UNITED STATES PATENTS

| | | | |
|---|---|---|---|
| 1,695,493 | 12/1928 | Holmes | 144—32 |
| 1,852,736 | 4/1932 | Connell | 144—32 |
| 1,882,913 | 10/1932 | Richey | 144—32 |
| 2,535,670 | 12/1950 | Croft | 144—3 X |
| 2,591,005 | 4/1952 | Piper | 144—32 |
| 3,146,811 | 10/1964 | Shryock | 144—32 |

DONALD R. SCHRAN, *Primary Examiner.*